United States Patent
Pillai et al.

(10) Patent No.: US 12,518,553 B2
(45) Date of Patent: Jan. 6, 2026

(54) SYSTEM AND METHOD FOR AUTOMATED DOCUMENT ANALYSIS

(71) Applicant: Schlumberger Technology Corporation, Sugar Land, TX (US)

(72) Inventors: Prashanth Pillai, Pune (IN); Purnaprajna Raghavendra Mangsuli, Pune (IN); Karan Pathak, Pune (IN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/548,628

(22) PCT Filed: Mar. 1, 2022

(86) PCT No.: PCT/US2022/018299
§ 371 (c)(1),
(2) Date: Sep. 1, 2023

(87) PCT Pub. No.: WO2022/187215
PCT Pub. Date: Sep. 9, 2022

(65) Prior Publication Data
US 2024/0153299 A1 May 9, 2024

(30) Foreign Application Priority Data
Mar. 1, 2021 (IN) .............................. 202121008448

(51) Int. Cl.
*G06V 30/416* (2022.01)
*G06F 40/106* (2020.01)
(Continued)

(52) U.S. Cl.
CPC .......... *G06V 30/416* (2022.01); *G06F 40/106* (2020.01); *G06V 30/1463* (2022.01);
(Continued)

(58) Field of Classification Search
CPC ............. G06V 30/416; G06V 30/1475; G06V 30/1463; G06V 30/16; G06V 30/19147; G06V 30/414; G06V 30/42; G06F 40/106
See application file for complete search history.

(56) References Cited

U.S. PATENT DOCUMENTS 5,784,487 A    7/1998   Cooperman
5,835,712 A * 11/1998   DuFresne ........... G06F 21/6227
                                                    709/219
(Continued)

FOREIGN PATENT DOCUMENTS

WO    2020132850 A1   7/2020

OTHER PUBLICATIONS

Borges Oliveira, D. A. et al., "Fast CNN-Based Document Layout Analysis", IEEE International Conference on Computer Vision Workshops, ICCVW 2017, pp. 1173-1180.
(Continued)

*Primary Examiner* — Nicholas Augustine
(74) *Attorney, Agent, or Firm* — Jeffrey D. Frantz

(57) ABSTRACT

A method involves detecting primary entities in a document, involving determining that a subset of the primary entities are associated with a first primary entity type, and determining a second primary entity type of one of the primary entities. The method further involves processing the primary entity of the second primary entity type to determine a secondary entity type of the primary entity. The secondary entity type is a subcategory of the second primary entity type. The method also involves hierarchically organizing the primary entities into a document layout structure that includes a top level and a child level. The top level is established by the first subset of primary entities based on the first primary entity type identifying the first subset as headings, and the child level is established by the primary
(Continued)

entity based on the second primary entity type, the child level identifying the secondary entity type.

17 Claims, 8 Drawing Sheets

(51) Int. Cl.
| | |
|---|---|
| *G06V 30/146* | (2022.01) |
| *G06V 30/16* | (2022.01) |
| *G06V 30/19* | (2022.01) |
| *G06V 30/414* | (2022.01) |
| *G06V 30/42* | (2022.01) |

(52) U.S. Cl.
CPC .......... *G06V 30/1475* (2022.01); *G06V 30/16* (2022.01); *G06V 30/19147* (2022.01); *G06V 30/414* (2022.01); *G06V 30/42* (2022.01)

(56) References Cited

U.S. PATENT DOCUMENTS

| | | | | |
|---|---|---|---|---|
| 6,185,587 | B1* | 2/2001 | Bernardo | G06F 40/166 |
| | | | | 707/E17.112 |
| 7,194,678 | B1* | 3/2007 | Koike | G06F 16/972 |
| | | | | 709/224 |
| 7,458,021 | B2* | 11/2008 | Balasubramanyan | |
| | | | | G06F 40/186 |
| | | | | 715/236 |
| 7,788,579 | B2 | 8/2010 | Berkner et al. | |
| 8,799,829 | B2* | 8/2014 | Grosz | G06F 3/04845 |
| | | | | 709/219 |
| 9,990,347 | B2 | 6/2018 | Raskovic et al. | |
| 10,607,170 | B1 | 3/2020 | Basu et al. | |
| 2002/0073125 | A1* | 6/2002 | Bier | G06F 40/166 |
| | | | | 715/255 |
| 2003/0172343 | A1* | 9/2003 | Leymaster | G06Q 20/40 |
| | | | | 715/234 |
| 2003/0233425 | A1* | 12/2003 | Lyons | H04L 67/02 |
| | | | | 709/217 |
| 2004/0107405 | A1* | 6/2004 | Schein | G06F 9/52 |
| | | | | 709/200 |
| 2007/0067297 | A1* | 3/2007 | Kublickis | G06Q 30/02 |
| | | | | 707/999.009 |
| 2009/0265607 | A1* | 10/2009 | Raz | G06F 16/957 |
| | | | | 709/217 |
| 2011/0161178 | A1* | 6/2011 | Rosenstein | G06Q 30/0273 |
| | | | | 705/14.69 |
| 2013/0117151 | A1* | 5/2013 | Macaisa | G06Q 30/0633 |
| | | | | 705/26.8 |
| 2014/0075385 | A1* | 3/2014 | Wan | H04W 4/029 |
| | | | | 715/812 |
| 2014/0143252 | A1* | 5/2014 | Silverstein | G06Q 10/105 |
| | | | | 707/809 |
| 2015/0093021 | A1 | 4/2015 | Xu et al. | |
| 2015/0120357 | A1* | 4/2015 | Tuchman | G06Q 10/063114 |
| | | | | 705/7.15 |
| 2015/0317750 | A1* | 11/2015 | Benhuri | H04L 65/1073 |
| | | | | 705/319 |
| 2017/0116581 | A1* | 4/2017 | Shah | G06Q 10/1097 |
| 2019/0156115 | A1 | 5/2019 | Cohen et al. | |
| 2019/0294641 | A1 | 9/2019 | Alexeev et al. | |
| 2020/0160050 | A1 | 5/2020 | Bhotika et al. | |
| 2020/0184278 | A1 | 6/2020 | Zadeh et al. | |
| 2020/0285939 | A1* | 9/2020 | Baker | G06N 3/088 |
| 2020/0293712 | A1* | 9/2020 | Potts | G16H 10/60 |
| 2020/0311412 | A1 | 10/2020 | Prebble | |
| 2020/0364451 | A1 | 11/2020 | Ammar et al. | |
| 2021/0200943 | A1* | 7/2021 | Aviyam | G06F 16/953 |
| 2021/0366099 | A1* | 11/2021 | Liao | G06F 40/216 |

OTHER PUBLICATIONS

Casado-Garcia, A. et al., "The Benefits of Close-Domain Fine-Tuning for Table Detection in Document Images", arXiv:1912.05846v1, 2019, 15 pages.

Paliwal, S. et al., "TableNet: Deep Learning model for end-to-end Table detection and Tabular data extraction from Scanned Document Images", arXiv:1001.01469, 2020, 6 pages.

Yan, S. et al., "Cross Media Entity Extraction and Linkage for Chemical Documents", Proceedings of the 25th AAAI Conference on Artificial Intelligence, 2011, pp. 1457-1458.

Sibolla, B. et al. "An Automated Approach to Mining and Visual Analytics of Spatiotemporal Context from Online Media Articles", published 2018, downloaded from URL: <https://researchspace.csir.co.za/dspace/bitstream/handle/10204/10289/Sibolla_20790_2018.pdfsequence=1>, 12 pages.

Qasim, S. R. et al., "Rethinking Table Recognition using Graph Neural Networks", arXiv:1905.13391v2, published Jul. 3, 2019, downloaded from URL: <https://arxiv.org/pdf/1905.13391v2.pdf>, 6 pages.

Zhong, X. et al., "Image-based table recognition: data, model, and evaluation", arXiv:1911.01683v5, published Mar. 4, 2020, downloaded from URL: <https://arxiv.org/pdf/1911.10683.pdf>, 11 pages.

Search Report and Written Opinion of International Patent Application No. PCT/US2022/018299 dated Apr. 1, 2022, 11 pages.

International Preliminary Report on Patentability of International Patent Application No. PCT/US2022/018299 dated Sep. 14, 2023, 7 pages.

Schreiber, S. et al., "DeepDeSRT: Deep Learning for Detection and Structure Recognition of Tables in Document Images", 2017 14th IAPR International Conference on Document Analysis and Recognition (ICDAR), Kyoto, Japan, 2017, 6 pages.

Rausch, J. et al., "DocParser: Hierarchical Document Structure Parsing from Renderings" Jan. 25, 2021, 19 pages, arxiv.org, Cornell University Library, 201 Olin Library, Cornell University, Ithaca, NY 14853, XP081864612, Association for the Advancement of Artificial Intelligence (www.aaai.org).

Extended European Search Report issued Jan. 17, 2025 in EP Application No. 22763882.2, 7 pages.

* cited by examiner

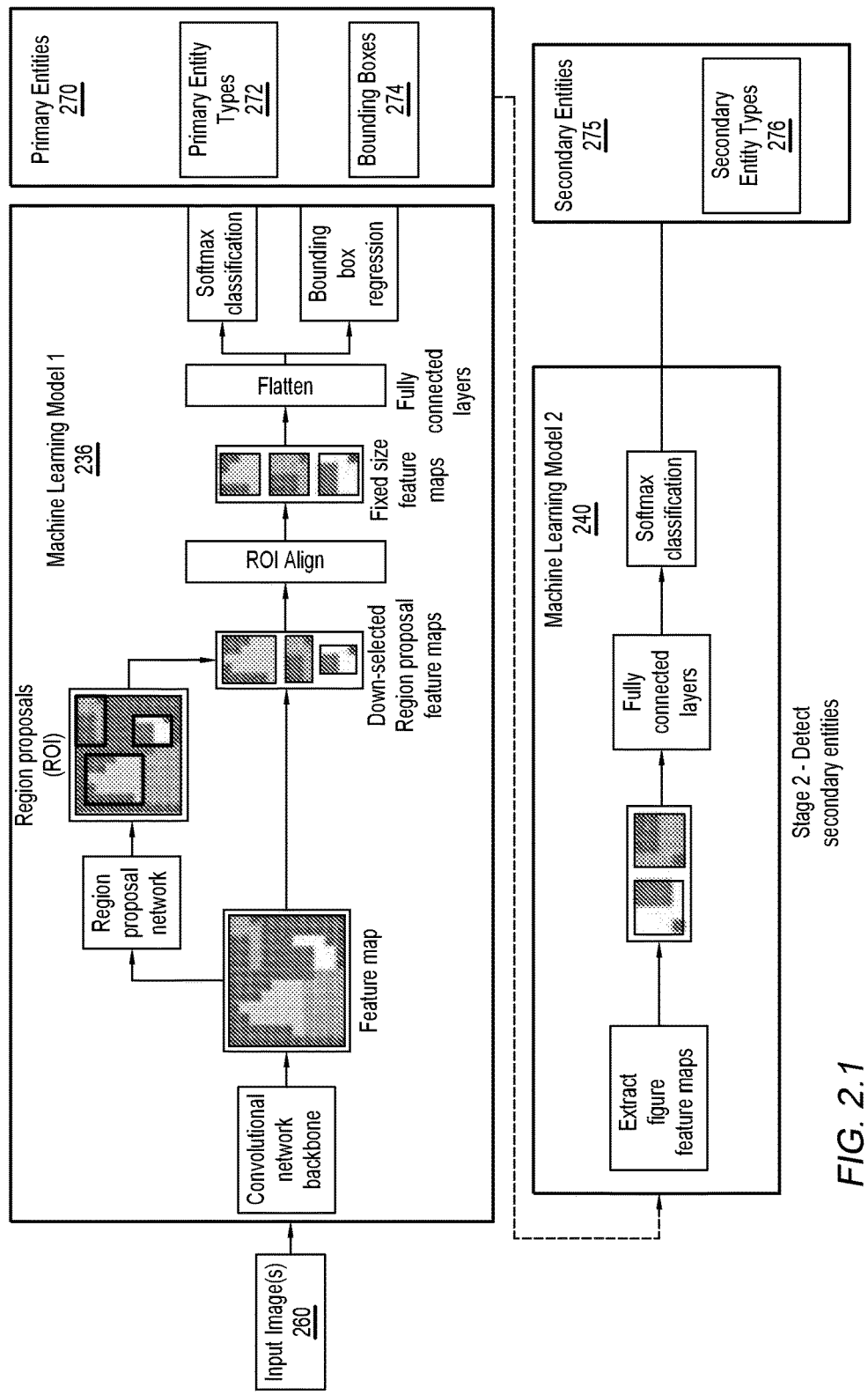
FIG. 2.1

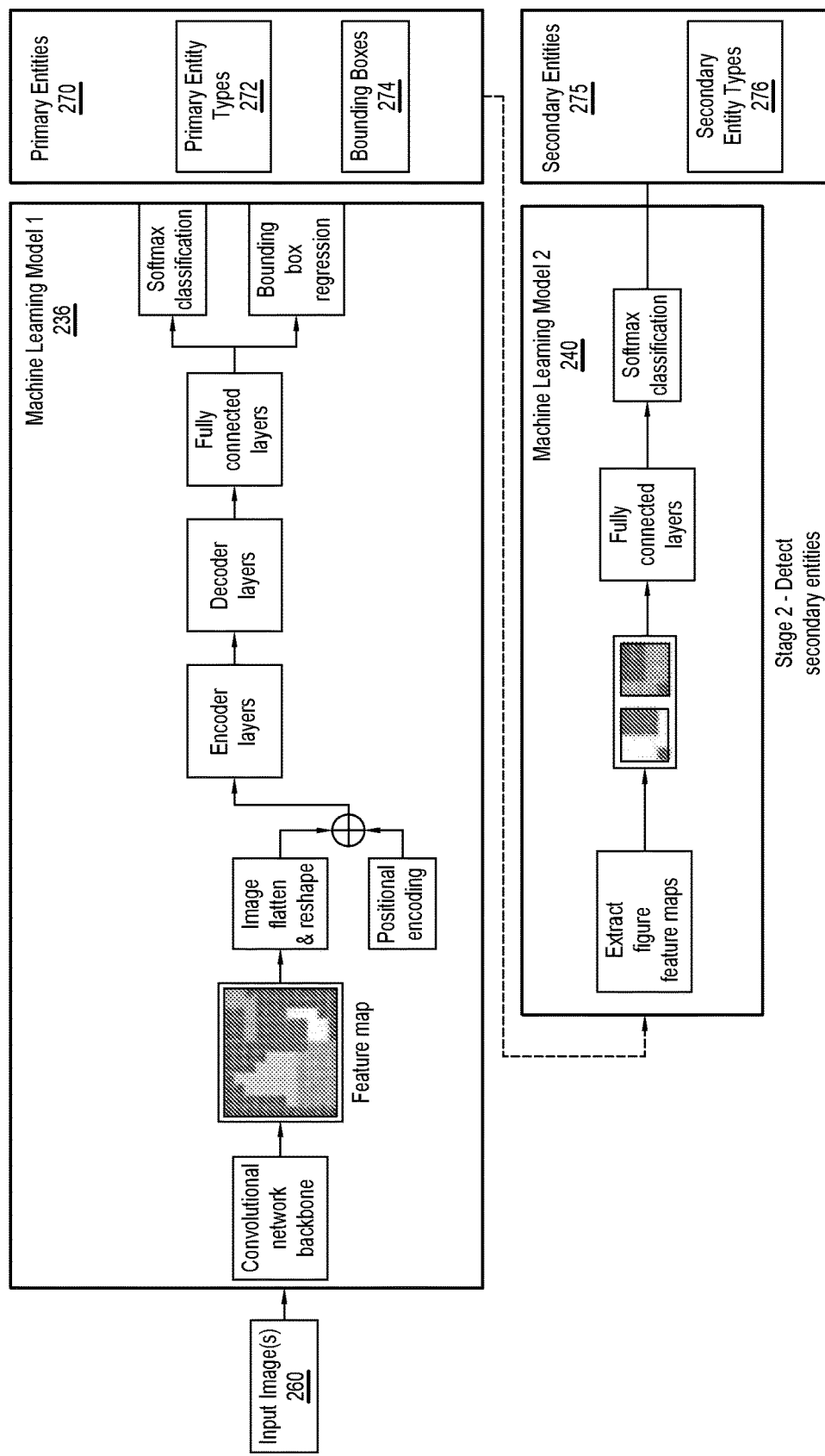
FIG. 2.2

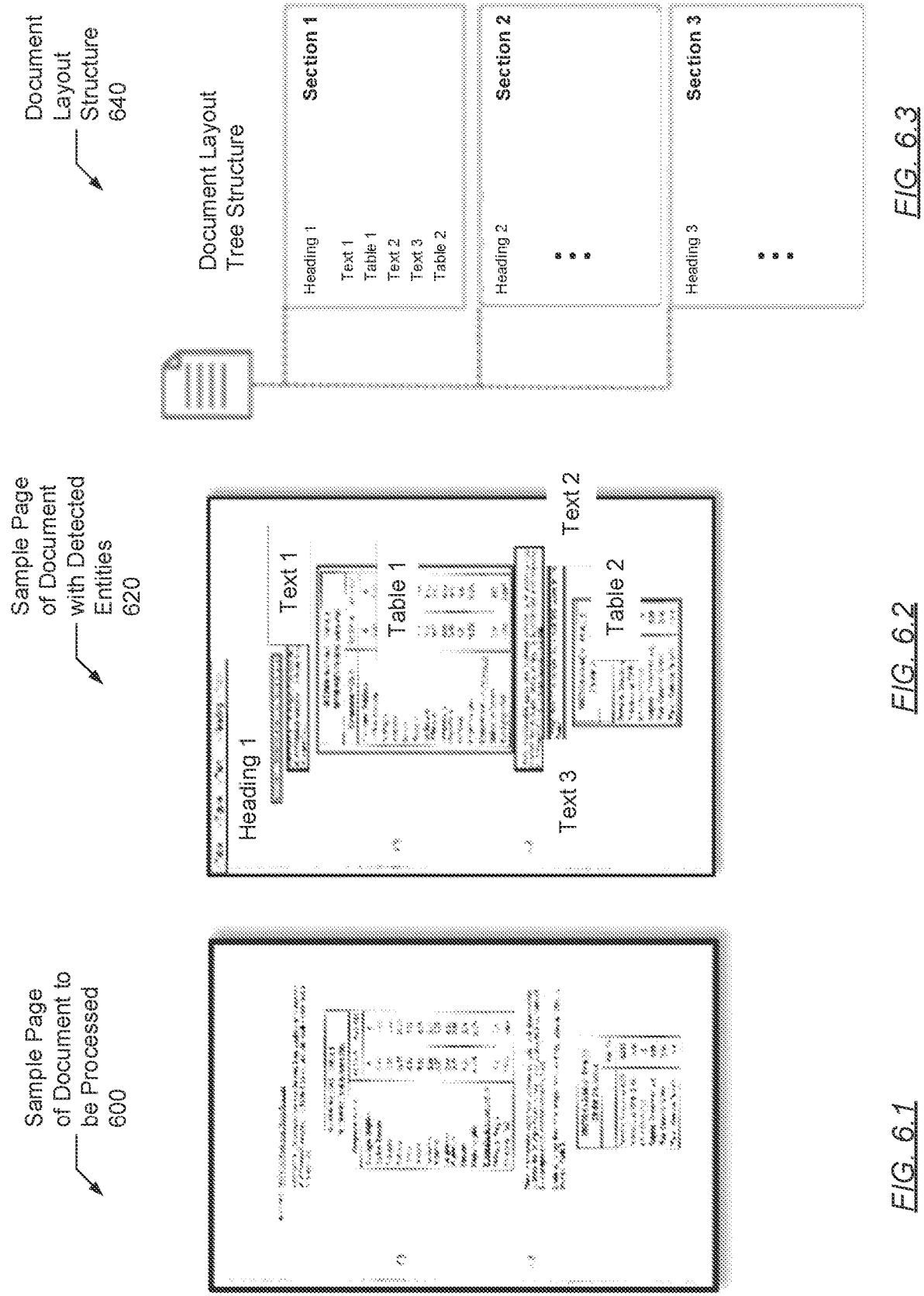
FIG. 6.1
FIG. 6.2
FIG. 6.3

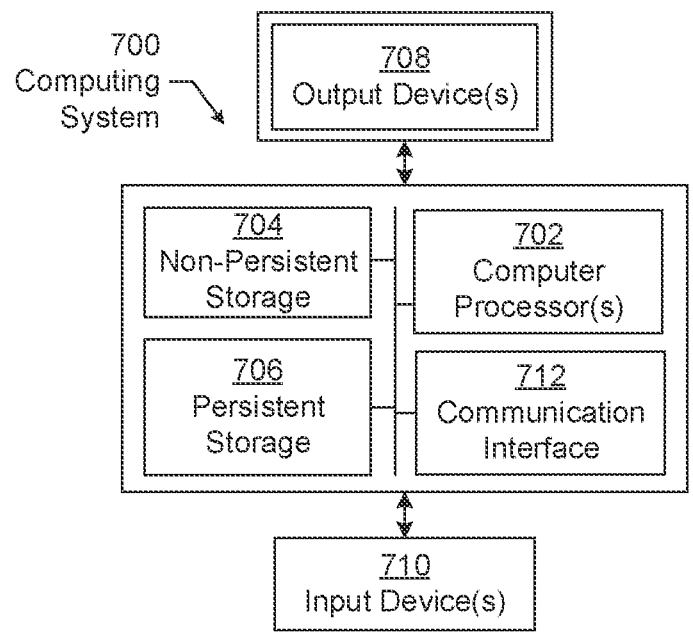
FIG. 7.1
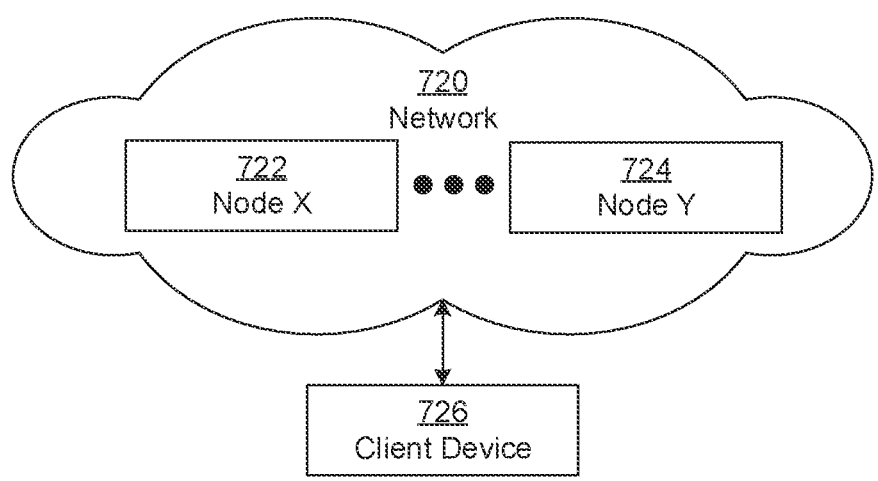
FIG. 7.2

SYSTEM AND METHOD FOR AUTOMATED DOCUMENT ANALYSIS

CROSS-REFERENCE TO RELATED APPLICATIONS

The present application is a National Stage entry of International Patent Application No. PCT/US2022/018299, filed on Mar. 1, 2022, which claims priority benefit of Indian Patent Application number 202121008448, filed in India on Mar. 1, 2021, the entirety of each of which is incorporated by reference herein and should be considered part of this specification.

BACKGROUND

Oil and gas documents/reports such as lithology reports, drilling reports, stratigraphy reports, well summary plan etc. include technical information represented in the form of various document entities like tables, forms, figures, captions, headings etc. It may be desirable to extract information from these documents/reports, which may be highly heterogenous in content and format.

SUMMARY

In general, in one or more aspects, the disclosure relates to a method for automated document analysis. The method comprises detecting, in a document, by a first machine learning model, a plurality of primary entities, the detecting comprising: determining that a first subset of the plurality of primary entities are associated with a first primary entity type that identifies the first subset as headings, and determining a second primary entity type of a primary entity of the plurality of primary entities; processing, by a second machine learning model, the primary entity of the plurality of primary entities associated with the second primary entity type, to determine a secondary entity type of the primary entity, wherein the secondary entity type is a subcategory of the second primary entity type; hierarchically organizing the plurality of primary entities into a document layout structure, the document layout structure comprising a top level and a child level, the top level established by the first subset of primary entities based on the first primary entity type identifying the first subset as headings, and the child level established by the primary entity based on the second primary entity type, the child level identifying the secondary entity type; and storing the document layout structure.

In general, in one or more aspects, the disclosure relates to a system for automated document analysis. The system comprises a computer processor; and instructions executing on the computer processor causing the system to: detect, in a document, by a first machine learning model, a plurality of primary entities, the detecting comprising: determining that a first subset of the plurality of primary entities are associated with a first primary entity type that identifies the first subset as headings, and determining a second primary entity type of a primary entity of the plurality of primary entities; process, by a second machine learning model, the primary entity of the plurality of primary entities associated with the second primary entity type, to determine a secondary entity type of the primary entity, wherein the secondary entity type is a subcategory of the second primary entity type; hierarchically organize the plurality of primary entities into a document layout structure, the document layout structure comprising a top level and a child level, the top level established by the first subset of primary entities based on the first primary entity type identifying the first subset as headings, and the child level established by the primary entity based on the second primary entity type, the child level identifying the secondary entity type; and store the document layout structure.

In general, in one or more aspects, the disclosure relates to a non-transitory computer readable medium comprising computer readable program code causing a computer system to: detect, in a document, by a first machine learning model, a plurality of primary entities, the detecting comprising: determining that a first subset of the plurality of primary entities are associated with a first primary entity type that identifies the first subset as headings, and determining a second primary entity type of a primary entity of the plurality of primary entities; process, by a second machine learning model, the primary entity of the plurality of primary entities associated with the second primary entity type, to determine a secondary entity type of the primary entity, wherein the secondary entity type is a subcategory of the second primary entity type; hierarchically organize the plurality of primary entities into a document layout structure, the document layout structure comprising a top level and a child level, the top level established by the first subset of primary entities based on the first primary entity type identifying the first subset as headings, and the child level established by the primary entity based on the second primary entity type, the child level identifying the secondary entity type; and store the document layout structure.

Other aspects will be apparent from the following description and the appended claims.

BRIEF DESCRIPTION OF DRAWINGS

FIGS. 2.1 and 2.2 show example implementations of a deep learning-based entity detection in accordance with disclosed embodiments.

FIGS. 6.1, 6.2, and 6.3 show examples in accordance with disclosed embodiments.

FIG. 7.1 and FIG. 7.2 show computing systems in accordance with disclosed embodiments.

DETAILED DESCRIPTION

Figure 1:
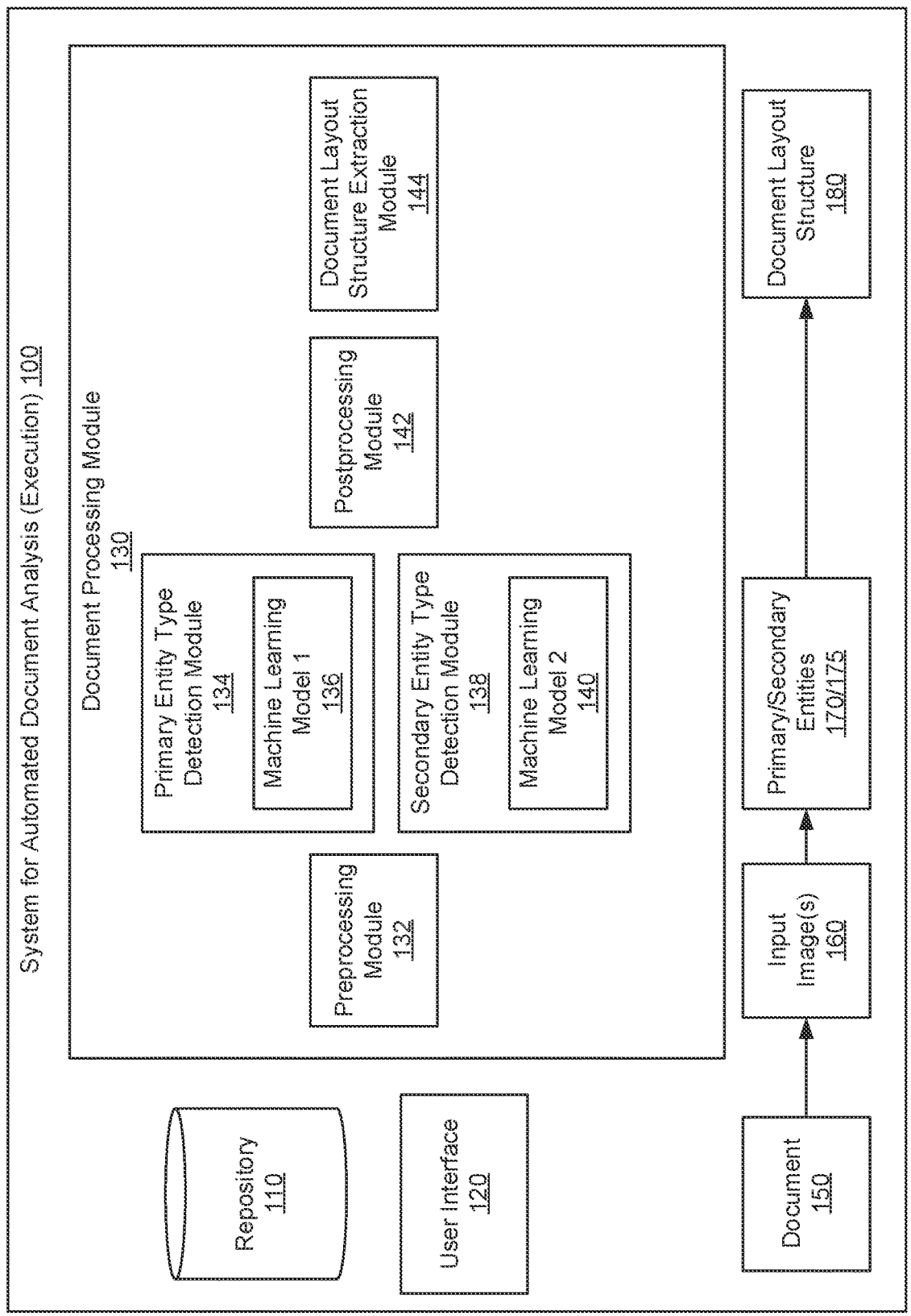
FIG. 1 shows a diagram of a system in accordance with disclosed embodiments.

Specific embodiments will now be described in detail with reference to the accompanying figures. Like elements in the various figures are denoted by like reference numerals for consistency.

In the following detailed description of embodiments of the technology, numerous specific details are set forth in order to provide a more thorough understanding. However, it will be apparent to one of ordinary skill in the art that various embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to be a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure use machine learning models to automate document analysis. Oil and gas documents/reports such as lithology reports, drilling reports, stratigraphy reports, well summary plans, well completion reports, geochemical reports, etc., include technical information represented in the form of various document entities like tables, forms, figures, captions, headings etc. More generally, an entity is a unit or collection of displayable content in a document. Specifically, whereas a document may be located in a file, and the file has associated metadata, the entity is a collection of content within the document itself. In one or more embodiments, the entity is not the encoding of the content as defined by the file format of the file having the document, but rather the displayed content. Primary and secondary entities may be distinguished. Primary entities may be tables, forms, figures, captions, headings etc. For one primary entity, there may be multiple secondary entities to provide a distinction at a higher granularity. For example, for an entity of the type "figure", a distinction may be made between the secondary entities "graph", "photo", "drawing", etc. The content and format of documents/reports may be highly heterogenous. In one or more embodiments of the disclosure, machine learning models are used to perform an automated document analysis. The machine learning models may extract information present in a report and may establish entity-based relations to facilitate subsequent document knowledge extraction. More specifically, embodiments of the disclosure involve one or more of (1) a pre-processing module that performs preliminary image preprocessing operations on a document; (2) a deep learning-based object detection module to locate individual entities like tables, figures, paragraphs, headings in a given document page; (3) a post-processing module that uses information from an optical character recognition (OCR) extraction and object detection framework for fine-tuning the predicted entitities' location; (4) a document layout structure extraction module that creates a document structure (e.g., a hierarchical structure) based on entity localization predictions. Availability of the document structure may facilitate downstream tasks including named entity recognition, entity relationship modelling, reading comprehension & QA, etc.

Embodiments of the disclosure may be integrated in an overall document layout prediction workflow that integrates these modules with other downstream modules, which may rely on the content of the processed documents. One or more embodiments further include a synthetic document generator configured to generate a corpus of synthetic training data. The corpus of synthetic training data may be used to train the deep learning-based object detection module. The use of the corpus of synthetic training data may enable the training even when relatively few or even an insufficient number of labeled documents are initially available. The synthetic training data may further be richer than the initially available labeled documents. For example, wider varieties of tables, figures, forms, styles, colors, and/or font types of figures, tables, and forms, their spatial locations in the documents, etc. may be included.

FIGS. 1, 2.1, 2.2, and 3 show diagrams of embodiments that are in accordance with the disclosure. The various elements, systems, and components shown in FIGS. 1, 2.1, 2.2, and 3 may be omitted, repeated, combined, and/or altered as shown from FIGS. 1, 2.1, 2.2, and 3. Accordingly, the scope of the present disclosure should not be considered limited to the specific arrangements shown in FIGS. 1, 2.1, 2.2, and 3.

Figure 3:
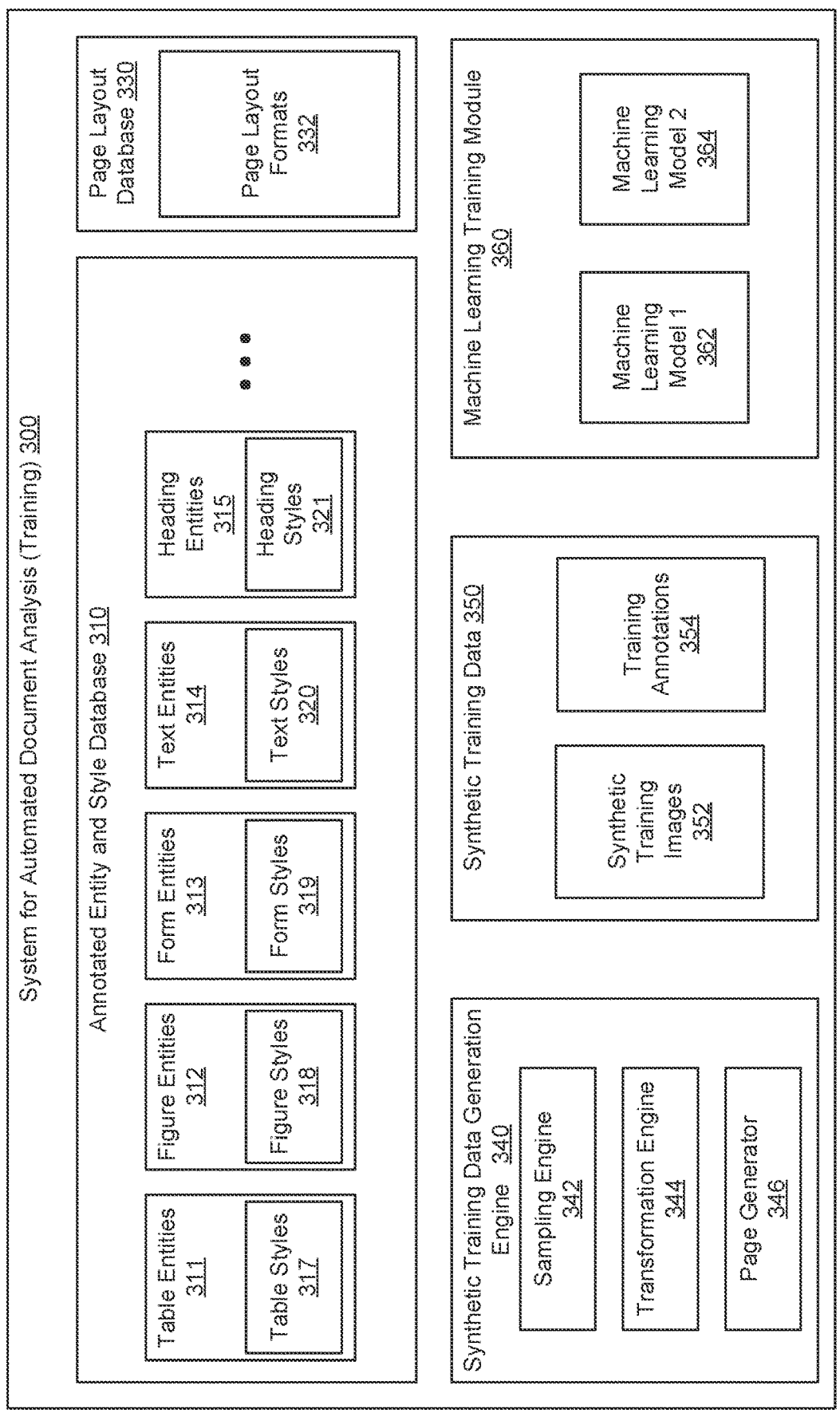
FIG. 3 shows a diagram of a system in accordance with disclosed embodiments.

FIG. 1 schematically shows a system for automated document analysis, in accordance with one or more embodiments. The system (100) is shown in a configuration for executing the automated document analysis. A configuration for training machine learning models of the system (100) is shown in FIG. 3. The system (100) may reside on a computing system as described below in FIGS. 7.1 and 7.2. Broadly speaking, the system (100) may operate on a document (150) to detect and locate primary and secondary entities (170, 175). A document layout structure (180) is subsequently generated. The document (150), the primary and secondary entities (170, 175), the document layout structure (180), and various components involved in the operations performed by the system (100) are subsequently described.

The document (150) may be any kind of document in any document format. The document (150) may be a document in the domain of oil and gas, such as lithology report, a drilling report, a stratigraphy report, a well summary plan etc., and may include information represented in the form of various document entities like tables, forms, figures, captions, headings etc. The document may be obtained from a repository (110) or by a user interface (120).

The repository (110), in one or more embodiments, stores any number of documents to be processed (150). The repository (110) may be any type of repository suitable for storing documents in any type of document format suitable for the representation of text, tables, images, etc. The repository (110) may reside in a non-volatile memory and/or in a volatile memory, either locally or in a cloud environment.

The user interface (120), in one or more embodiments, enables the system (100) to receive the document (150) from a user. The document (150) may be selected from the documents in the repository (110), by the user, via the user interface (120). The document (150) may also be uploaded to the system (100) via the user interface (120). The user interface may further display the document layout structure (180) to the user. The user interface may be a local or remote interface. If remote, the display may be transmitted for display on a user's local device.

In one or more embodiments, the document (150) is processed by a document processing module (130) to detect primary and/or secondary entities (170, 175) in the document (150), and to generate a document layout structure (180) based on the document (150) and the primary and/or secondary entities (170/175). An example of a document (150) is provided in FIG. 6.1, an example of primary/secondary entities (170, 175) detected in a document is provided in FIG. 6.2, and a document layout structure (180) is provided in FIG. 6.3.

In one or more embodiments, the document (150) is processed by a preprocessing module (132). The preprocessing module (132) may perform preliminary image preprocessing operations on the document (150). For example, the preprocessing module (132) may isolate the pages of the document (150) to generate a separate input image (160) for each of the pages. Any image format may be used. The preprocessing may also involve a grayscale conversion (e.g., from RGB to grayscale). The preprocessing may further involve an image scaling (e.g., to a fixed size such as 1024×1024 pixels) including a padding to convert to the fixed size.

The preprocessing may also involve a skewness correction. Skewness in scanned document pages may be common in many documents, e.g., scanned, copied, and/or repeatedly copied documents. The skewness correction may be performed by performing an edge detection (e.g., a Canny edge detection) on the images of the document pages, performing Hough transforms, determining prominent edges and a skew angle, and finally based on the skew angle, de-skew the images of the document pages.

The preprocessing may also involve a document page orientation correction. Pages of a document may be rotated, which may pose challenges for an object detection framework. A page orientation correction may be obtained by performing optical character recognition (OCR) of the document pages in four orientations. A script detection module may then decipher the texts obtained by the OCR operations, and the detected script type may allow identification of the correct document page orientations based on the orientation of the detected script type. Further, the aspect ratio of text bounding boxes may be assessed for added confidence in the prediction of the correct document page orientation.

After the preprocessing (if necessary or desired), a two-stage processing may be performed to identify primary and/or secondary entities (170, 175) of the report to be processed (150). The primary entity type detection module (134) may operate on the input images (160) of the document pages. The primary entity type detection module (134), in one or more embodiments, is configured to detect primary entities (170). A primary entity, in accordance with one or more embodiments, is content of the document, the content being of a particular type. Entity types, corresponding to particular types of content include, but are not limited to, tables, forms, figures, charts, paragraphs, captions, headings, text etc. In one or more embodiments, entities may later be organized in the document layout structure (170), e.g., in a hierarchical manner. For example, an entity of the type "heading" may be placed at the top level of a tree-like structure, followed by one or more subheadings, etc. Notably, the top level may be superseded by a root level having a root node for the overall document itself. Entities of other types, such as tables, forms, figures, text, etc. may be arranged in child levels of the document layout structure. The child levels are directly or indirectly under the top level based on representing entities under the headings, sub-headings, etc., thus establishing a hierarchical structure. In one or more embodiments, the primary entity type detection module (134) is further configured to locate the detected primary entities by establishing bounding boxes for the detected primary entities. In one or more embodiments, the primary entity detection may be performed by a machine learning model (136), described below in reference to FIGS. 2.1 and 2.2. In one or more embodiments, the machine learning model (136) has been previously trained. The system used for training is described below in reference to FIG. 3.

The detected primary entities (170) along with spatial locations of the primary entities in the document (150) may facilitate building entity relations and summarizing information present in the document (150). In other words, after the detection of the primary entities (170), the primary entities may be linked, e.g., to form a hierarchical structure. Moreover, the localization of the primary entities may enable an efficient text extraction using optical character recognition/intelligent character recognition (OCR/ICR), specific to the primary entities.

The secondary entity type detection module (138) may also operate on the output of the primary entity type detection module (134). The secondary entity type detection module (138) is configured to perform an additional classification of the primary entities (170) determined by the primary entity type detection module (134) to determine secondary entity types of secondary entities (175). A secondary entity (175), in accordance with one or more embodiments, is content of the document, the content being of a particular type (i.e., secondary entity type), and that may be considered a subcategory of a primary entity. For example, after the primary entity type detection module (134) detects a primary entity (170) that is a figure, the secondary entity type detection module (138) may determine the secondary entity type of figure, e.g., whether the figure is a well log, a graph, a seismic image, a well log, a well schematic, a core analysis image, etc. Thus, a secondary entity is a primary entity that is further classified into a subcategory. In one or more embodiments, the secondary entity detection may be performed by a machine learning model (140), described below in reference to FIGS. 2.1 and 2.2. In one or more embodiments, the machine learning model (140) has been previously trained. The system used for training is described below in reference to FIG. 3.

An example of the output of the primary and secondary entity type detection modules (134, 138) is provided in FIG. 6.2.

A postprocessing module (142) may operate on the output of the primary/secondary entity type detection modules (134, 138). It is possible that the bounding boxes as predicted by the primary entity type detection module have undercuts or bounding box offsets on the associated primary entity. The undercut may have a significant impact, e.g., if a downstream entity text extraction task relies on the predicted bounding boxes, which would then not be entirely enclosed by the bounding boxes. The issue may be addressed by the postprocessing module (142). The postprocessing module may independently perturb the edges of the bounding boxes. A standard deviation of pixel intensity along the edges may be computed as the edges are perturbed. A higher standard deviation may indicate that the edge cuts through text, whereas a lower standard deviation suggests that the edge is on a background, e.g., a plain background. Accordingly, the edges of the bounding boxes may be shifted to provide low values for standard deviation, by the postprocessing module (142).

In one or more embodiments, after the optional postprocessing, a document layout structure extraction module (144) creates a document layout structure (180) based on the detected primary and/or secondary entities (170, 175) and the associated localization predictions of the bounding boxes. After the primary and/or secondary entities (170, 175) have been localized in the input images (160), the document layout structure extraction module (144) may partition the input images (160), using the locations of the primary entities. The partitioning may initially be performed based on an entity type at the top of a hierarchical order of entity types. For example, the partitioning may be performed using the entity type "heading". Entities of other types (e.g. tables, text, etc.) in the resulting partitions may be linked to the partitions. In the example, the entities of other types may be linked to the entity of the type "heading". A further sub-partitioning may be performed based on primary entities of the type "sub-heading", etc. Text content identified by bounding boxes may be processed by OCR operations, to incorporate the text content in the document layout structure (180). An example of a resulting document layout structure (180) is shown in FIG. 6.3.

Turning to FIG. 2.1, an example implementation of a deep learning-based object detection in accordance with disclosed embodiments, is shown. In the example, an input image (260) is processed by the machine learning model 1 (236) performing the detection of primary entities (270), including entity types (272) and bounding boxes (274). Machine learning model 1 (236) is a deep learning-based neural network including a convolutional network backbone operating on the input image (260) to generate a feature map. The feature map is processed by a region proposal network to identify bounding boxes establishing regions of interest where the features are located in the feature map. Using the bounding boxes, a down-selected region proposal feature map may be generated for each of the regions of interest. The down-selected region proposal feature maps may be normalized by a region of interest alignment operation to obtain fixed-size feature maps. Each of the fixed-size feature maps may undergo a flattening operation by fully connected layers, followed by a softmax classification and a bounding box regression. The softmax classification may output a primary entity type (272), and the bounding box regression may output coordinates of the bounding box (274).

The machine learning model 2 (240), in one or more embodiments, performs a detection of secondary entities (275), as previously described in reference to FIG. 1. The machine learning model 2 (240) detects and outputs secondary entity types (276) for the secondary entities. Figure feature maps are extracted. The obtained figure feature maps are processed by a classification network that includes fully connected layers and a softmax classification. While the machine learning model 2 (240) is configured to operate on figures, additional machine learning models analogous to the machine learning model 2 (240) may operate on other types of primary entities. For example, there may be a machine learning model that operates on primary entities of the type 'table' to detect secondary entity types like nested tables, rotated tables, zonation tables, handwritten tables etc. In similar lines, separate machine learning models may be developed to detect different secondary entity types for forms, texts, headings etc.

Turning to FIG. 2.2, an example implementation of a deep learning-based object detection in accordance with disclosed embodiments, is shown. The implementation of FIG. 2.2 may serve as an alternative to the implementation of FIG. 2.1. In the example, an input image (260) is processed by the machine learning model 1 (236) performing the detection of primary entities (270), including entity types (272) and bounding boxes (274). Machine learning model 1 (236) is a deep learning-based neural network including a convolutional network backbone operating on the input image (260) to generate a feature map. The feature map is processed by an image flatten and reshape operation and a positional encoding, followed by a sequence of encoder decoder layers and fully connected layer. At the output, a softmax classification and a bounding box regression are performed. The softmax classification may output an entity type (272), and the bounding box regression may output coordinates of the bounding box (274).

The machine learning model 2 (240), in one or more embodiments, performs a detection of secondary entities (275), as previously described in reference to FIG. 1. The operation may be as described for FIG. 2.1.

While particular architectures of the machine learning model 1 (236) and the machine learning model 2 (240) are shown in FIGS. 2.1 and 2.2, other architectures capable of predicting types and locations of primary and secondary entities (270, 275) may be used, without departing from the disclosure.

Turning to FIG. 3, a system (300) for automated document analysis, in accordance with one or more embodiments, is shown in a training configuration. The system (300) includes a synthetic training data generation (340) to generate synthetic training data (350) using content obtained from an annotated entity and style database (310) and a page layout database (330). The system (300) further includes a machine learning training module (360) for training the machine learning module 1 (362) and the machine learning module 2 (364), using the synthetic training data (350).

In one or more embodiments, the synthetic training data (350) is artificially generated, unlike historical training data that may have been collected over time. The use of the synthetic training data (350) may address the limitation of sufficient annotated images of historical documents not necessarily being available for model training purposes. The synthetic training data (350) may be generated from relatively few examples of annotated historical document images, or even in complete absence of labeled historical document images.

In one or more embodiments, historical document images are manually annotated. A user may obtain a set of historical documents and may annotate entities in these historical documents. For example, the user may label all entities that are tables as tables, all entities that are figures as figures, etc. Each of the entities identified as a table may be stored in the annotated entity database organized under table entities (311). Similarly, each of the entities identified as a figure may be stored in the annotated entity database organized under figure entities (312). Other entities that may be stored in a similar manner include, but are not limited to, form entities (313), text entities (314), and heading entities (315). As a result of the user adding entities from historical documents to the annotated entity and style database (310), a variety of entities may be stored in the database (310). Within each type of entity, some variety may exist. For example, text entities (314) may include shorter texts, longer texts, texts with different font styles, font sizes, etc. Figure entities (312) may include different types of figures, such as photos, drawings, maps, charts, etc. As an alternative to extracting the entities from historical documents, the entities may also be generated by the user. For example, the user may choose to store a chart in the database (310) as a figure entity (312).

Each of the entities (311-315) may include variations of the entity style (317-321). Entity styles may establish different types of formatting of the associated entities. For example, entity styles may include background color, line style, font size, font type, font color, line spacing, etc. Entity styles may be applied to entities to generate additional variations of the entity. For example, the table styles (317) may be applied to the table entities (311) to change the background color, line styles, font sizes, etc.

In one or more embodiments, the page layout database (330) stores page layout formats (332). A page layout format (332) may signify the manner in which entities are arranged in a page of a document (for example a page with double columns, a single column, a mix of single and double columns, columns of the same or different widths, only paragraphs, a page with a figure in the center or elsewhere, a page with a table, combinations of text, figures, and/or tables etc.).

In one or more embodiments, the synthetic data generation engine (340) uses content of the databases (310, 330) to generate the synthetic training data (350). The sampling engine (342) may sample the entities (311-315) with different styles (317-321) and the page layout formats (332) to select content for generating synthetic training images (352). Repeated sampling may result in a variety of synthetic training images (352). For example, one resulting synthetic training image (352) may be in single column format, may include a table at the bottom of the page, and text. A standard font may be used for the table and the text. Another resulting synthetic training image (352) may be in two column format, may include two small figures embedded in the columns, and one larger table spanning both columns. Some of the text may be bold, and the table may have a gray background.

In one or more embodiments, the transformation engine (344) may introduce additional variations. For example, the synthetic training images to be generated may be rescaled, the orientation may be changed, brightness and/or contrast may be adjusted, noise may be added, etc. In addition to applying the transformation engine (344) on a page level, the transformation engine (344) may also be applied at a level of individual entities like tables, figures to introduce required entity specific transformations like rotation, skewness, translation, noise, contrast etc. Any distortion that may exist in an actual document may be introduced, to account for possible ways an entity may be present in a document.

In one or more embodiments, the page generator (346) creates the synthetic training images (352) with varied document formats, entity styles, font types, spatial locations, etc. (based on the sampled page layout formats (332), entities (311-315), entity styles (317-321), background noise (added by the transformation engine (346)), etc. The page generator (346) may also create the training annotations (354) (or ground truth data) for the generated synthetic training images (352). The training annotations may indicate the types of entities present in the synthetic training images (352), and the location of the entities (e.g., bounding box and bounding box location) in the synthetic training images (352).

The operations of the synthetic training data generation engine (340) may be repeated to generate many (e.g., thousands of) synthetic training images (352) and the corresponding training annotations (354). The combination of the synthetic training images (352) and the corresponding training annotations (354) may form a training corpus to be used by the machine learning module (360).

In one or more embodiments, the machine learning training module (360) is configured to train the machine learning model 1 (362), using the synthetic training data (350). In one or more embodiments, the machine learning module (360) is further configured to train the machine learning model 2 (364). The training may be performed using a subset of the synthetic training data (350). Assume, for example, that the machine learning model 2 (364) is configured to perform the detection of secondary entities for the primary entities of the type "figure", to determine whether the primary entity of the type "figure" is a map, a graph/chart, a well log, an equipment schematic, a seismic image, or a core image. In this case, the training may be performed using figures that are maps, graphs/charts, well logs, equipment schematics, seismic images, and core images, and the corresponding training annotations.

For both the machine learning model 1 (362) and the machine learning model 2 (364), a loss function may compare the outputs of the machine learning models to the training annotations (354), when operating on the synthetic training images (352). Backpropagation may be used to update the machine learning models based on the difference between the machine learning model outputs and the training annotations serving as the ground truth.

After the training, machine learning model 1 (362) and machine learning model 2 (364) may be used in the systems described in reference to FIGS. 1, 2.1, and 2.2.

Figure 4:
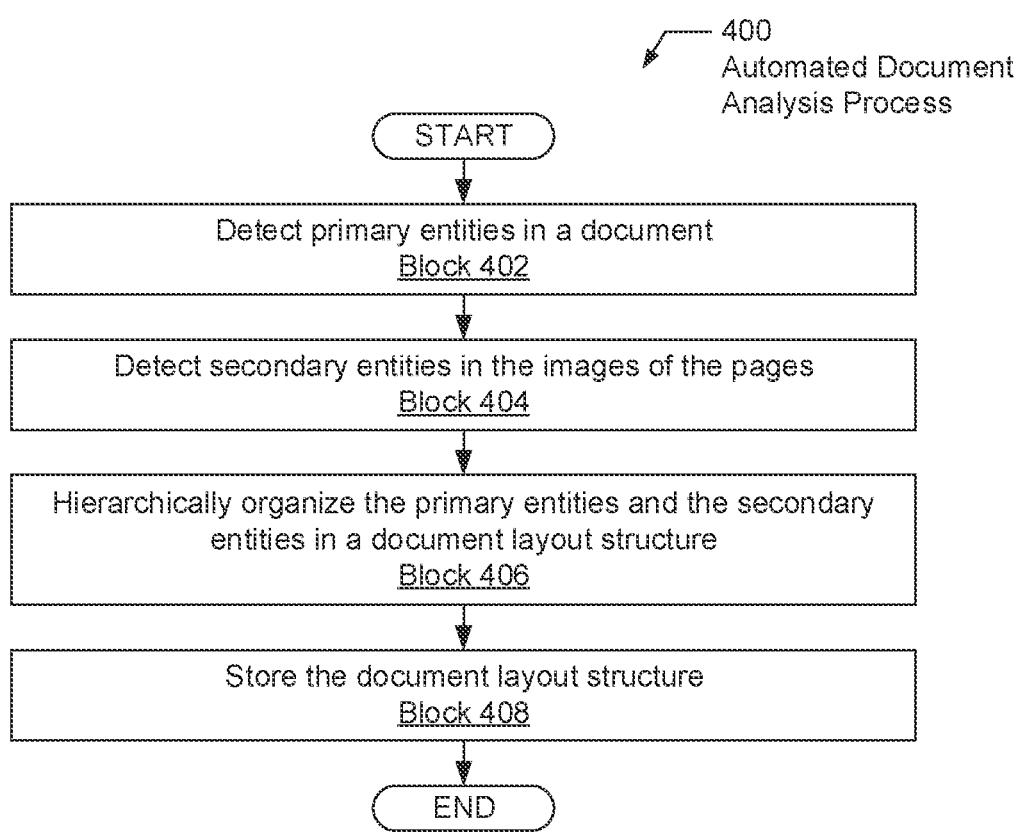
FIG. 4 shows a flowchart in accordance with disclosed embodiments.
Figure 5:
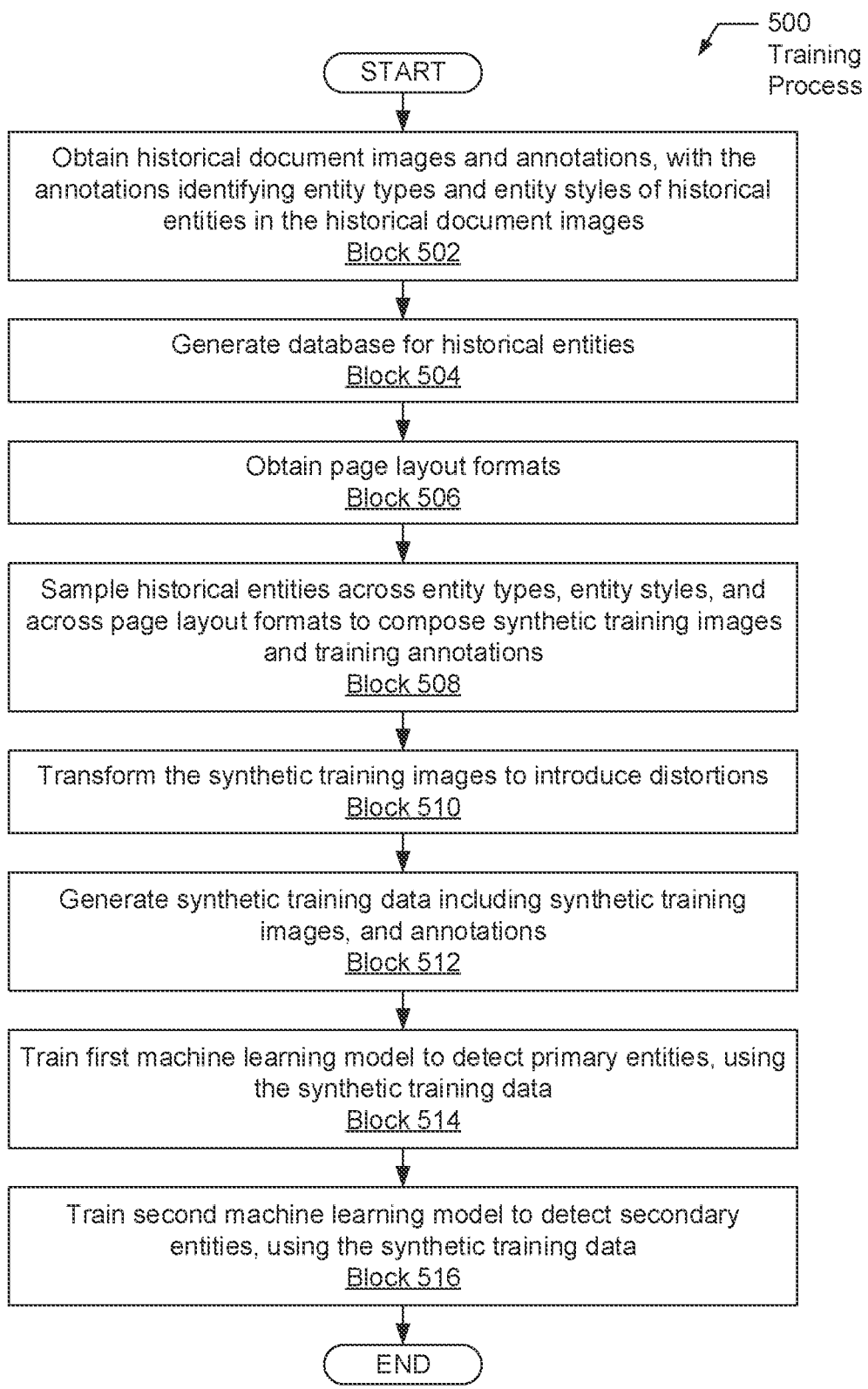
FIG. 5 shows a flowchart in accordance with disclosed embodiments.

FIG. 4 and FIG. 5 show flowcharts of the execution of the automated document analysis (400) and the training process (500), respectively, in accordance with the disclosure. While the various blocks in the flowcharts are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven. By way of an example, determination blocks may not have a processor process an instruction unless an interrupt is received to signify that condition exists. As another example, determinations may be performed by performing a test, such as checking a data value to test whether the value is consistent with the tested condition.

Turning to FIG. 4, the automated document analysis process (400) relies on machine learning framework to detect entities (including primary and/or secondary entities) in a document. The primary and/or secondary entities are then hierarchically organized, e.g. in a document layout tree structure.

Prior to the execution of the operations of the blocks shown in FIG. 4, a document is obtained. The obtaining of the document may be performed as previously described in reference to FIG. 1. For example, the document may be loaded from a repository or the document may be received from a user via a user interface. The document may be received in any document format.

Next, the document is segmented into pages. The segmenting into pages may be performed as described in reference to FIG. 1.

Further, each of the pages is preprocessed to obtain an input image. The obtaining of the input images may be performed by a preprocessing module, as described in reference to FIG. 1.

In Block 402, each of the input images is processed to detect one or more primary entities in the input images. Further, a bounding box, including the geometry and location of the bounding box, in the input images, may determined for each primary entity. The detection of the primary entities and the placement of the bounding boxes may be performed by the machine learning model 1, as shown in FIG. 1, and as further described in reference to FIGS. 2.1 and 2.2. Detected primary entities may be, for example, of the type "heading", "subheading", "figure", "table", etc.

In Block 404, one or more secondary entities are detected in the input images. Secondary entities may be detected by performing an additional classification of the primary entities detected by the operations of Block 402. For example, in case of a primary entity that is a figure, the operations of Block 410 may determine the type of figure, e.g., whether the figure is a well log, a graph, a schematic, a seismic image, a core analysis image, etc. The detection of the secondary entities may be performed by the machine learning model 2, as shown in FIG. 1, and as further described in reference to FIGS. 2.1 and 2.2.

A postprocessing of the primary and/or secondary entities may further be performed to adjust the bounding boxes obtained by the operations of Block 402. The postprocessing may be performed by a postprocessing module, as described in reference to FIG. 1.

In Block 406, a document layout structure is generated. Generating the document layout structure may involve hierarchically organizing the primary entities into the document layout structure. The document layout structure may include a top level, followed by one or more child levels, etc. The top level may be formed by a primary entity of the primary entity type "heading". Child levels may be formed by other primary entity types. In one embodiment, one of the primary entities on the child level also is a secondary entity type. For example, a primary entity of the primary entity type "figure" may be identified as being of the secondary entity type "chart" or "drawing". Additional details are provided in reference to FIG. 1.

In Block 408, the document layout structure is stored in a database, and/or forwarded for further downstream processing.

Turning to FIG. 5, the training process (500) is performed to obtain the machine learning models used for the execution of the automated document analysis process (400) of FIG. 4. The training process (500) may be performed prior to a first execution of the automated document analysis process (400), and/or when new training data becomes available. Synthetic training data that includes synthetic training images and training annotations may be generated, and subsequently the first machine learning model and the second machine learning model may be trained. The flowchart of FIG. 5 summarizes the operations previously described with reference to FIG. 3.

In Block 502, historical document images and annotations are obtained. The annotations may identify entity types and/or entity styles of historical entities in the historical document images. The historical documents and annotations may be obtained as described in reference to FIG. 3.

In Block 504, a database is generated for the obtained historical entities. The historical entities may be arranged by entity type. The database may include the different styles of the historical entities. The database may be generated as described in reference to FIG. 3.

In Block 506, page layout formats are obtained. The page layout formats may be obtained as described in reference to FIG. 3.

In Block 508, a sampling of the historical entities is performed across the entity types and entity styles, to compose synthetic training images and training annotations.

In Block 510, one or more of the synthetic training images may be transformed to introduce distortions, as described in reference to FIG. 3.

In Block 512, synthetic training data including the synthetic training images and the annotations associated with the historical entities in the training images is generated, as described in reference to FIG. 3.

In Block 514, the first machine learning model is trained to detect primary entities, using the synthetic training data, as described in reference to FIG. 3.

In Block 516, the second machine learning model is trained to detect secondary entities, using the synthetic training data, as described in reference to FIG. 3.

Turning to FIGS. 6.1, 6.2, and 6.3, examples in accordance with disclosed embodiments are shown. FIG. 6.1 shows an example of a sample page of a document (600), in accordance with embodiments of the disclosure. The example illustrates the possibility of reduced quality, including poor and fluctuating contrast, artifacts, misalignment, etc. FIG. 6.2 shows an image of the sample page with primary entities detected (620). The detected primary entities include tables and texts, identified by bounding boxes. FIG. 6.3 shows an example a document layout structure (640), in accordance with embodiments of the disclosure.

Embodiments of the disclosure were evaluated based on approximately 4,000 test pages as shown in the example of FIGS. 6.1, 6.2, and 6.3, and demonstrated a ~90% recall (i.e. detection rate), and ~94% precision.

Embodiments of the disclosure provide a methodology for an automated document analysis. Primary entities (e.g., tables, forms, figures, captions, headings, etc.) may be spatially located, and subsequently, secondary entities (e.g., well logs, core images, seismic images, well schematics, etc.) may be spatially located in a document. The two-stage design may improve prediction accuracy and may reduce the complexity of the machine learning models and the model tuning, e.g., for new entity types. In one or more embodiments, the spatially located entities are integrated into a document layout structure. Embodiments of the disclosure may facilitate a holistic interpretation of the entities in documents, thereby facilitating and potentially improving downstream operations, e.g., on content of the documents. Applications that may benefit from embodiments of the disclosure include, but are not limited to:

- Extracting select attributes and values from several documents (like drilling parameters, fossil types, rock depth etc., in the oil & gas industry) using named entity recognition methods
- Automated document structuring may enable a search engine to query a document repository for specific entity types (for example, query for all tables related to drilling or images on core analysis, in the oil & gas industry)
- Document summarization
- Building relations among entity types (e.g., a relation of tabular content with a citation in a paragraph)
- Information aggregation from multiple documents.

Training a machine learning model for object detection is known to require a large training data corpus with corresponding annotations/ground truth (usually labelled manually). Manual annotation of multiple documents for various entity types is laborious and not scalable. In one or more embodiments, a synthetic page generator is used to create a training corpus incorporating varied document styles. This process results in reduced manual annotations requirements, produces a larger corpus with a wider variety of document styles, thus helping in better model learning. The approach facilitates scaling the detection of multiple entity types in a document.

Embodiments disclosed herein may be implemented on a specialized computing system that is modified through the software code executing on the computing system. Any combination of mobile, desktop, server, router, switch, embedded device, or other types of hardware may be used. For example, as shown in FIG. 7.1, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the technology.

The computing system (700) in FIG. 7.1 may be connected to or be a part of a network. For example, as shown in FIG. 7.2, the network (720) may include multiple nodes (e.g., node X (722), node Y (724)). Each node may correspond to a computing system, such as the computing system shown in FIG. 7.1, or a group of nodes combined may correspond to the computing system shown in FIG. 7.1. By way of an example, embodiments of the technology may be implemented on a node of a distributed system that is connected to other nodes. By way of another example, embodiments of the technology may be implemented on a distributed computing system having multiple nodes, where each portion of the technology may be located on a different node within the distributed computing system. Further, one or more elements of the aforementioned computing system (700) may be located at a remote location and connected to the other elements over a network.

Although not shown in FIG. 7.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7.1. Further, the client device (726) may include and/or perform all or a portion of one or more embodiments of the technology.

The computing system or group of computing systems described in FIGS. 7.1 and 7.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the technology. The processes may be part of the same or different application and may execute on the same or different computing system.

Rather than or in addition to sharing data between processes, the computing system performing one or more embodiments of the technology may include functionality to receive data from a user. For example, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the technology, may extract one or more data items from the obtained data. For example, the extraction may be performed as follows by the computing system in FIG. 7.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7.1, while performing one or more embodiments of the technology, may perform data comparison. Data comparison may be used to compare two or more data values (e.g., A, B). For example, one or more embodiments may determine whether $A>B$, $A=B$, $A\mathrel{!}=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., A−B), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the technology, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 7.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 7.1 and the nodes and/or client device in FIG. 7.2. Other functions may be performed using one or more embodiments of the technology.

While the technology has been described with respect to a limited number of embodiments, those skilled in the art, having benefit of this disclosure, will appreciate that other embodiments can be devised which do not depart from the scope as disclosed herein. Accordingly, the scope of the technology should be limited only by the attached claims.

What is claimed is:

1. A method, comprising:
   detecting, in a document, by a first machine learning model, a plurality of primary entities, the primary entities being selected from among: a table, a form, a figure, a chart, a paragraph, a caption, a heading, or text, the detecting comprising:
      determining that a first subset of the plurality of primary entities is associated with a first primary entity type that identifies the first subset as headings appearing in the document; and
      determining a second primary entity type of a primary entity among the plurality of primary entities, the second primary entity type being one of a type selected from among: a table, a form, a figure, a chart, a paragraph, a caption, a heading, or text;
   processing, by a second machine learning model, the primary entity among the plurality of primary entities associated with the second primary entity type, to determine a secondary entity type of the primary entity, the secondary entity type being a subcategory of the second primary entity type;
   automatically hierarchically organizing the plurality of primary entities into a document layout structure, the document layout structure comprising a top level and a child level, the top level being established by the first subset of primary entities based on the first primary entity type identifying the first subset as the headings appearing in the document, and the child level being established by the primary entity based on the second primary entity type, the child level identifying the secondary entity type, the document layout structure comprising a tree structure;
   outputting and displaying the tree structure, including the headings appearing in the document and at least one second primary entity type, via a user interface; and
   storing the document layout structure, including the tree structure, including the headings appearing in the document and the at least one second primary entity type, in association with the document in a memory device.

2. The method of claim 1, further comprising, prior to the detecting the plurality of primary entities by the first machine learning model:
   segmenting the document into pages; and
   preprocessing the pages, the preprocessing comprising converting the pages into input images.

3. The method of claim 2, wherein the preprocessing further comprises a skewness correction.

4. The method of claim 2, wherein the preprocessing further comprises a document page orientation correction.

5. The method of claim 1, wherein:
   the second primary entity type is a figure; and
   the secondary entity type is at least one of: a map, a graph, a well log, an equipment schematic, a seismic image, or a core image.

6. The method of claim 1, wherein the detecting the plurality of primary entities further comprises generating a plurality of bounding boxes around the plurality of primary entities in the document.

7. The method of claim 6, further comprising shifting edges of the plurality of bounding boxes to completely enclose the plurality of primary entities by the bounding boxes.

8. The method of claim 1, further comprising:
   generating synthetic training data, the synthetic training data comprising:
      a plurality of synthetic training images; and
      a plurality of training annotations; and
   training the first machine learning model and the second machine learning model using the synthetic training data.

9. The method of claim 8, wherein the generating the synthetic training data comprises:
   obtaining a plurality of historical document images and a plurality of annotations, the plurality of annotations identifying entity types and entity styles of a plurality of historical entities in the plurality of historical document images;
   generating a database for the plurality of historical entities;
   obtaining a plurality of page layout formats; and
   sampling the plurality of historical entities across the entity types and the entity styles, and across the page layout formats to compose the synthetic training images and the training annotations.

10. The method of claim 8, wherein the generating the synthetic training data further comprises transforming a synthetic training image among the plurality of synthetic training images to perform at least one of changing a scale, changing an orientation, adjusting a brightness, adjusting a contrast, adding noise, introducing a skewness, or introducing a translation.

11. A system, comprising:
one or more computer processors; and
instructions executing on the computer processor causing the system to:
  detect, in a document, by a first machine learning model, a plurality of primary entities, the primary entities being selected from among: a table, a form, a figure, a chart, a paragraph, a caption, a heading, or text, the detecting comprising:
    determining that a first subset of the plurality of primary entities is associated with a first primary entity type that identifies the first subset as headings appearing in the document; and
    determining a second primary entity type of a primary entity among the plurality of primary entities, the second primary entity type being one of a type selected from among: a table, a form, a figure, a chart, a paragraph, a caption, a heading, or text;
  process, by a second machine learning model, the primary entity among the plurality of primary entities associated with the second primary entity type, to determine a secondary entity type of the primary entity, the secondary entity type being a subcategory of the second primary entity type;
  automatically hierarchically organize the plurality of primary entities into a document layout structure, the document layout structure comprising a top level and a child level, the top level being established by the first subset of primary entities based on the first primary entity type identifying the first subset as the headings appearing in the document, and the child level being established by the primary entity based on the second primary entity type, the child level identifying the secondary entity type, the document layout structure comprising a tree structure;
  outputting and displaying the tree structure, including the headings appearing in the document and at least one second primary entity type, via a user interface; and
  store the document layout structure, including the tree structure, including the headings appearing in the document and the at least one second primary entity type, in association with the document in a memory device.

12. The system of claim 11, wherein the first machine learning model and the second machine learning model are deep learning-based machine learning models.

13. The system of claim 11, wherein the instructions executing on the computer processor further cause the system to:
  generate synthetic training data, the synthetic training data comprising:
    a plurality of synthetic training images; and
    a plurality of training annotations; and
  train the first machine learning model and the second machine learning model using the synthetic training data.

14. A computer program product comprising computer readable program code for causing a computer system to perform a method comprising:
  detecting, in a document, by a first machine learning model, a plurality of primary entities, the primary entities being selected from among: a table, a form, a figure, a chart, a paragraph, a caption, a heading, or text, the detecting comprising:
    determining that a first subset of the plurality of primary entities is associated with a first primary entity type that identifies the first subset as headings appearing in the document; and
    determining a second primary entity type of a primary entity among the plurality of primary entities, the second primary entity type being one of a type selected from among: a table, a form, a figure, a chart, a paragraph, a caption, a heading, or text;
  processing, by a second machine learning model, the primary entity among the plurality of primary entities associated with the second primary entity type, to determine a secondary entity type of the primary entity, the secondary entity type being a subcategory of the second primary entity type;
  automatically hierarchically organizing the plurality of primary entities into a document layout structure, the document layout structure comprising a top level and a child level, the top level being established by the first subset of primary entities based on the first primary entity type identifying the first subset as the headings appearing in the document, and the child level being established by the primary entity based on the second primary entity type, the child level identifying the secondary entity type, the document layout structure comprising a tree structure;
  outputting and displaying the tree structure, including the headings appearing in the document and at least one second primary entity type, via a user interface; and
  storing the document layout structure, including the tree structure, including the headings appearing in the document and the at least one second primary entity type, in association with the document in a memory device.

15. The method of claim 1, wherein the tree structure that is output and displayed via the user interface comprises:
  the top level of the tree structure as the first subset of the plurality of primary entities identified as a heading; and
  the child level of the tree structure comprising at least one secondary entity type, the at least one secondary entity type being a subcategory of the second primary entity type.

16. The system of claim 11, wherein the tree structure that is output and displayed via the user interface comprises:
  the top level of the tree structure as the first subset of the plurality of primary entities identified as a heading; and
  the child level of the tree structure comprising at least one secondary entity type, the at least one secondary entity type being a subcategory of the second primary entity type.

17. The computer program product of claim 14, wherein the tree structure that is output and displayed via the user interface comprises:
  the top level of the tree structure as the first subset of the plurality of primary entities identified as a heading; and
  the child level of the tree structure comprising at least one secondary entity type, the at least one secondary entity type being a subcategory of the second primary entity type.

* * * * *